US012646250B2

(12) United States Patent
Burns et al.

(10) Patent No.: US 12,646,250 B2
(45) Date of Patent: Jun. 2, 2026

(54) EXTENDED REALITY ASSISTANCE BASED ON USER UNDERSTANDING

(71) Applicant: Apple Inc., Cupertino, CA (US)

(72) Inventors: Aaron M. Burns, Sunnyvale, CA (US); Benjamin R. Blachnitzky, San Francisco, CA (US); Laura Sugden, Redmond, WA (US); Charilaos Papadopoulos, Redwood City, CA (US); James T. Turner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 18/398,689

(22) Filed: Dec. 28, 2023

(65) Prior Publication Data

US 2024/0221301 A1     Jul. 4, 2024

Related U.S. Application Data

(60) Provisional application No. 63/435,836, filed on Dec. 29, 2022.

(51) Int. Cl.
| | |
|---|---|
| *G06T 17/00* | (2006.01) |
| *G06F 3/01* | (2006.01) |
| *G06T 7/70* | (2017.01) |
| *G06V 40/16* | (2022.01) |
| *G06V 40/20* | (2022.01) |

(52) U.S. Cl.
CPC .............. *G06T 17/00* (2013.01); *G06F 3/011* (2013.01); *G06F 3/017* (2013.01); *G06T 7/70* (2017.01); *G06V 40/174* (2022.01); *G06V 40/28* (2022.01)

(58) Field of Classification Search
CPC ......... G06T 17/00; G06T 7/70; G06V 40/174; G06V 40/28; G06F 3/011; G06F 3/017
See application file for complete search history.

(56) References Cited

U.S. PATENT DOCUMENTS

| | | | |
|---|---|---|---|
| 9,909,878 B2 | 3/2018 | Beaurepaire | |
| 10,535,279 B2 | 1/2020 | Dialameh et al. | |
| 10,636,261 B2 | 4/2020 | Gabbay | |
| 11,158,126 B1 * | 10/2021 | Petrov ................ | G02B 27/0093 |
| 2011/0172907 A1 | 7/2011 | Rui Da Silva Freitas | |
| 2013/0328928 A1 * | 12/2013 | Yamagishi .............. | A63F 13/25 |
| | | | 345/633 |
| 2017/0286383 A1 | 10/2017 | Koul et al. | |
| 2017/0318407 A1 * | 11/2017 | Meister ................... | H04S 7/303 |
| 2020/0294311 A1 * | 9/2020 | Holz ..................... | H04N 13/271 |

(Continued)

FOREIGN PATENT DOCUMENTS

| | | |
|---|---|---|
| WO | 2021101460 A1 | 5/2021 |
| WO | 2022020344 A1 | 1/2022 |

*Primary Examiner* — Terrell M Robinson
(74) *Attorney, Agent, or Firm* — Thompson Hine LLP

(57) ABSTRACT

Various implementations disclosed herein provide augmentations in extended reality (XR) using sensor data from a user worn device. The sensor data may be used understand that a user's state is associated with providing user assistance, e.g., a user's appearance or behavior or an understanding of the environment may be used to recognize a need or desire for user assistance. The augmentations may assist the user by enhancing or supplementing the user's abilities, e.g., providing guidance or other information about an environment to disabled/impaired person.

24 Claims, 4 Drawing Sheets

(56)                    References Cited

U.S. PATENT DOCUMENTS

| 2020/0302510 | A1 |   | 9/2020 | Chachek et al. |
| 2021/0025727 | A1 |   | 1/2021 | Barnes et al. |
| 2022/0044021 | A1 | * | 2/2022 | Powderly ................. G06T 3/20 |
| 2022/0107202 | A1 | * | 4/2022 | Tirosh ................ G02B 27/0093 |

* cited by examiner

100
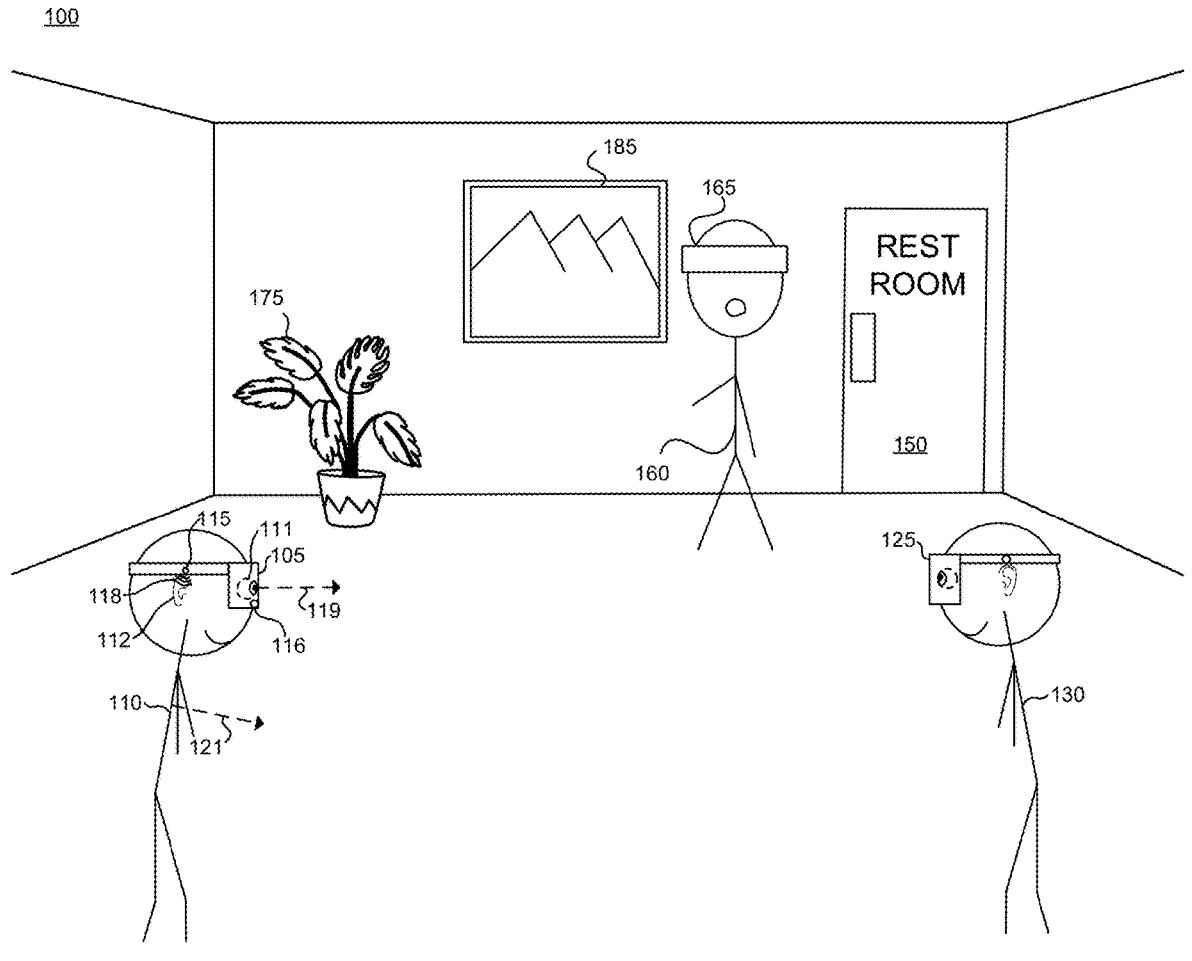
FIG. 1
FIG. 2
FIG. 3

400

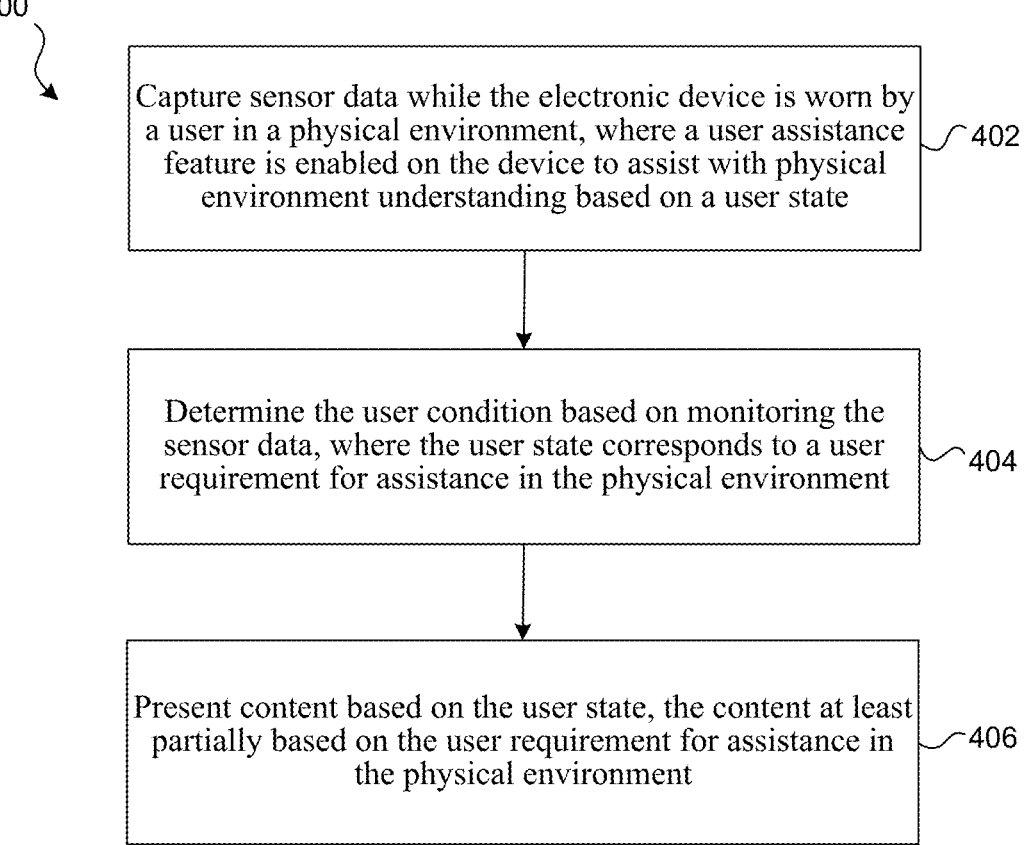

Capture sensor data while the electronic device is worn by a user in a physical environment, where a user assistance feature is enabled on the device to assist with physical environment understanding based on a user state ⟋402

Determine the user condition based on monitoring the sensor data, where the user state corresponds to a user requirement for assistance in the physical environment ⟍404

Present content based on the user state, the content at least partially based on the user requirement for assistance in the physical environment ⟋406

FIG. 4

Device 800

Memory 820

Processing
Unit(s)
802

Comm.
Interface(s)
808

Display(s)
812

Operating System 830

Instruction Set(s) 840

Content
Instruction Set 842

Scene Understanding
Instruction Set 844

Behavioral Tracking
Instruction Set 846

Physiological Tracking
Instruction Set 848

Environmental Assistance
Instruction Set 850

804

I/O Device(s)
& Sensor(s)
806

Programming
Interface(s)
810

Image
Sensor
System(s)
814

EXTENDED REALITY ASSISTANCE BASED ON USER UNDERSTANDING

CROSS-REFERENCE TO RELATED APPLICATIONS

This application claims the benefit of U.S. Provisional Application Ser. No. 63/435,836 filed Dec. 29, 2022, which is incorporated herein in its entirety.

TECHNICAL FIELD

The present disclosure generally relates to presenting content via electronic devices, and in particular, to systems, methods, and devices that present extended reality (XR) content to provide assistance to users.

BACKGROUND

Existing XR systems may not adequately assist users that need or desire user assistance in particular circumstances, e.g., when such users are unfamiliar with or otherwise needed help with how to navigate to particular objects, people, or destinations in a new environment.

SUMMARY

Various implementations disclosed herein include devices, systems, and methods that provide augmentations in XR using sensor data from a user worn device or other device in a physical environment. The sensor data may be used to understand that a user's state is associated with the user needing or wanting user assistance, e.g., a user's appearance or behavior or an understanding of the environment may be used to recognize a user's need or desire for assistance. The augmentations may assist the user by enhancing or supplementing the user's natural abilities with additional information, e.g., providing guidance or other information about an environment to a disabled/impaired person. In one example, based on a user exhibiting behavior indicative that assistance may be helpful (e.g., expressing unfamiliarity, confusion, or hesitation in facial or body language upon entering a new environment), information or guidance about the environment may be provided. A person with a vision impairment, for example, may be provided with navigational guidance towards a particular person or destination (e.g., open chair, bathroom, etc.). In another example, a user may provide a subtle, predetermined gesture (unlikely to be noticed by other people) that indicates the user's need or desire for assistance and such a gesture may be recognized as indicating a user state associated with providing user assistance, and appropriate assistance may be provided accordingly.

Some implementations are implemented via a device or system having a processor that implements instructions to perform a method to provide augmentations in XR using sensor data from a user worn device. Such a method may involve capturing sensor data while the electronic device is worn by a user in a physical environment. A user assistance feature (e.g., an accessibility feature) may be enabled on the device to assist the user with physical environment understanding based on monitoring a user state of the user.

In some implementations, such sensor data is captured via an image sensor, depth sensor, biometric sensor, physiological sensor, audio sensor, or a combination of these or other types of sensors. In one example, a device such as a head mounted device (HMD) has one or more outward or inward facing sensors that capture data (e.g., images) of at least a portion of one or more of the user's forehead, eye brows, eyes, eye lids, cheeks, nose, lips, chin, face, head, hands, wrists, arms, shoulders, torso, legs, or other body portion. The appearance (e.g., color, shape, etc.) and movement or behavior of such portions of the user may be assessed in determining user state. A user's speech and other sounds captured by an audio sensor may similarly be used to identify the user's state (e.g., based on identifying that the user is talking more quickly than normal or rambling, detecting that the user is in a loud or crowded environment, etc.). Sensor data may provide biological information, as examples, relating to a user's cardiovascular state (e.g., pulse), body temperature, breathing rate, etc. that facilitates identifying the user's state.

The method, in accordance with the accessibility feature being enabled, determines the user state and presents content based on the user's state. The user state in the physical environment is determined based on monitoring the sensor data, e.g., to determine whether the user state corresponds to a user requirement (e.g., predicted need or desire for) for assistance in the physical environment. Monitored the user's state may be based on, as examples, determining: (a) the user's familiarity with the physical environment, e.g., whether the user has been there before; (b) where the user's body is facing; (c) the user's current task (e.g., wanting to go to the bathroom, sit down, go to someone in particular); (d) whether user behavior, posture, expressions, gestures, etc. indicates that the user is in an uncertain, confused, hesitant, or other state in which augmentation could potentially address or otherwise help the user; or (e) the user providing a subtle gesture requesting assistance.

The method may present content, based on the user state, to attempt to at least partially mitigate (e.g., address or help with) the user requirement for assistance in the physical environment. For example, such content may help the user navigate, e.g., walk or otherwise relocate, to a desired location or goal, e.g., to the bathroom, an open seat, an exit, another person, etc. The content may be helpful to persons with disabilities/impairments, e.g., vision impaired persons, by providing audible or visible guidance with visibility/environment understanding enhancing features (e.g., informational annotations relatively large size and high contrast to enable use by visually impaired persons, audible cues for blind persons, graphical indications of sounds and sound sources for hearing impaired persons, etc.).

The content may provide instructions to provide information or help to guide the user to achieve one or more objectives. In one example, such guidance is based on identifying an orientation of the person's body, e.g., where the user's torso is currently facing and instructing the user relative to that torso-facing direction. Such guidance may use clock-based directions based on the user's current torso direction, e.g., providing an audible message that states "turn to 3 o'clock" (where 12 o'clock is the torso-facing direction and 3 o'clock is 90 degrees to the user's right) "and walk 10 paces and then find a chair at a 6 person table to sit down" (where paces are user specific based on tracking and assessing the length of the user's walking stride over time). In this example, as the user walks, the directions/guidance may adapt to the user's changing torso center to guide the user to specific locations with precision, e.g., correcting the user's course if they begin to deviate from an intended path.

In some implementations, determining the user state involves assessing user information or sensor data to determine user familiarity with the physical environment. User familiarity with the physical environment may be determined based on assessing data indicative of whether the user has previously visited the physical environment. User familiarity with the physical environment may be determined based on identifying uncertainty, hesitation, or confusion (or similar user attributes indicative of a user state associated with needing or desiring assistance) based on a posture, a behavior, a gesture, or an expression of the user. The user state may correspond to one or more user characteristics identified using an algorithm or machine learning model.

In some implementations, a user state is determined based on determining or tracking an orientation of a torso of the user in the physical environment. For example, a user turning back and forth or exhibiting other torso direction changes or patterns may be indicative of uncertainty or aborted attempts to navigate to an intended destination within an environment. In one example, a torso direction of a user is determined by an HMD based on one or more downward facing sensors that capture images or other data corresponding to the shoulders or other portions of the user's torso. Determining a torso direction may account for the current orientation of an HMD and the associated current orientation of the user's head.

In some implementations, a user state is based on identifying a current task of the user, e.g., wanting to meet with a particular person, go to a particular exhibit, utilize a type of furniture (e.g., sit on a sofa rather than wooden stool), wanting to use a rest room, etc.

In some implementations, user state is determined based on identifying a gesture requesting assistance, e.g., a subtle gesture requesting assistance. For example, a user briefly touching their chin—a gesture that other people may be unlikely to associate with user input—may be interpreted as a gesture enabling an accessibility feature, indicating that the user would like assistance, or that the user would like a particular type of assistance, e.g., navigation guidance to an open seat at a table.

In some implementation, content is provided that guides a user to move from a current location to a destination within the physical environment. For example, such content may guide the user based on identifying an orientation of a torso of the user relative to the physical environment and providing instructions relative to the orientation of the torso of the user relative to the physical environment. The instructions may be adapted based on changes to the orientation of the torso of the user changing as the user moves.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 illustrates an environment in which extended reality (XR) content is provided to a user with a disability or impairment or who otherwise exhibits behaviors or characteristics indicating a requirement for assistance, in accordance with some implementations.

FIG. 2 illustrates an example of sensor data interpreted to identify a requirement for assistance, in accordance with some implementations.

FIG. 3 illustrates another example of sensor data interpreted to identify a requirement for assistance, in accordance with some implementations.

FIG. 4 is a flowchart representation of a method for providing XR content based on identifying a user requirement for assistance, in accordance with some implementations.

Figure 5:
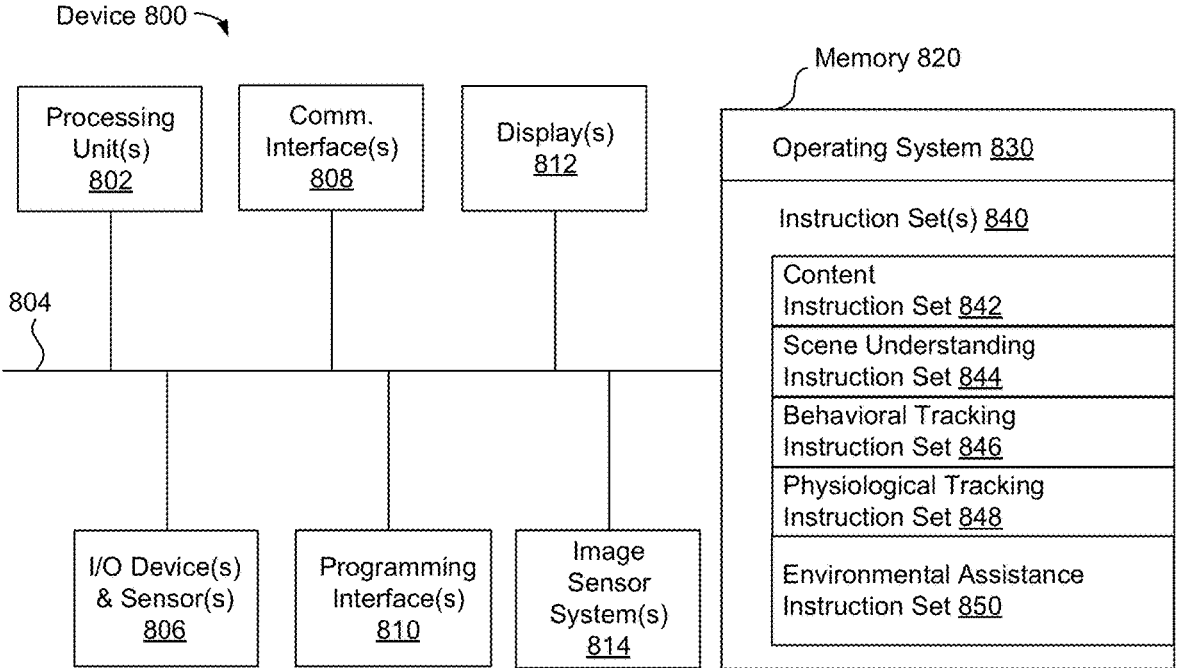
FIG. 5 illustrates device components of an exemplary device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates a real-world physical environment 100 including a first user 110 wearing a first device 105, a second user 130 wearing a second device 125, a third user 160 wearing a third device 165, a wall-hung picture 185, a plant 175, and a door 150 to a restroom. In some implementations, one or more of the devices 105, 125, 165 is configured to provide content based on one or more sensors on the respective devices or to share information and/or sensor data with one another. In some implementations, one or more of the devices 105, 125, 165 provide content that provides augmentations in XR using sensor data. The sensor data may be used to understand that a user's state is associated with providing user assistance, e.g., a user's appearance or behavior or an understanding of the environment may be used to recognize a need or desire for assistance.

In the example of FIG. 1, the first device 105 includes one or more sensors 116 that capture light-intensity images, depth sensor images, audio data or other information about the user 110 and the physical environment 100. For example, the one or more sensors 116 may capture images of the user's forehead, eyebrows, eyes, eye lids, cheeks, nose, lips, chin, face, head, hands, wrists, arms, shoulders, torso, legs, or other body portion. Sensor data about a user's eye 111, as one example, may be indicative of various user characteristics, e.g., the user's gaze direction 119 over time, user saccadic behavior over time, user eye dilation behavior over time, etc. The one or more sensors 116 may capture audio information including the user's speech and other user-made sounds as well as sounds within the physical environment 100.

One or more sensors, such as one or more sensors 115 on device 105, may identify user information based on proximity or contact with a portion of the user 110. As example, the one or more sensors 115 may capture sensor data that may provide biological information relating to a user's cardiovascular state (e.g., pulse), body temperature, breathing rate, etc.

The one or more sensors 116 or the one or more sensors 115 may capture data from which a user orientation 121 within the physical environment can be determined. In this example, the user orientation 121 corresponds to a direction that a torso of the user 110 is facing.

Some implementations disclosed herein determine a user understanding based on sensor data obtained by a user worn device, such as first device 105. Such a user understanding may be indicative of a user state that is associated with providing user assistance. In some example, a user's appearance or behavior or an understanding of the environment may be used to recognize a need or desire for assistance so that such assistance can be made available to the user. For example, based on determining such a user state, augmentations may be provided to assist the user by enhancing or supplementing the user's abilities, e.g., providing guidance or other information about an environment to disabled/impaired person.

In one example, based on the user 110 exhibiting behavior indicative that assistance may be helpful (e.g., expressing unfamiliarity, confusion, or hesitation in facial or body language upon entering a new environment), the device 105 provides information or guidance about the physical environment 100. In another example, the user 110 may provide a subtle gesture (unlikely to be noticed by other people) that indicates the user's desire for assistance or confirmation that the user 110 desire's assistance. For example, based on the device 105 determining that a state of the user 110 is indicative of the user potentially needing or desiring assistance, the device 105 may query whether the user wants such assistance, and the user may provide a subtle gesture in response to the query accepting or requesting the assistance. In another implementation, based on a particular assistance mode, e.g., an auto-assistance mode being enabled, the device 105 may automatically provide assistive content to the user 110.

Assistive content may be visible, e.g., displayed on a display of device 105, or audible, e.g., produced as audio 118 by a speaker of device 105. In the case of audio content, the audio 118 may be produced in a manner such that only user 110 is likely to hear the audio 118, e.g., via a speaker proximate the ear 112 of the user or at a volume below a threshold such that nearby persons (e.g., users 130, 160) are unlikely to hear. In some implementations, the audio mode (e.g., volume), is determined based on determining whether other persons are within a threshold distance or based on how close other persons are with respect to the user 110.

In some implementations, the content provided by the device 105 and sensor features of device 105 may be provided using components, sensors, or software modules that are sufficiently small in size and efficient with respect to power consumption and usage to fit and otherwise be used in lightweight, battery-powered, wearable products such as wireless ear buds or other ear-mounted devices or head mounted devices (HMDs) such as smart/augmented reality (AR) glasses. Features can be facilitated using a combination of multiple devices. For example, a smart phone (connected wirelessly and interoperating with wearable device(s)) may provide computational resources, connections to cloud or internet services, location services, etc.

In some implementations, data is shared amongst a group of devices to improve user state or environment understanding. For example, device 125 may share information (e.g., images, audio, or other sensor data) corresponding to user 110 or the physical environment 100 (including information about user 130 or user 160) with device 105 so that device 105 can better understand user 110 and physical environment 100.

In some implementations, devices 105, 125, 165 are head mounted devices (HMDs) that present visual or audio content (e.g., extended reality XR content) or have sensors that obtain sensor data (e.g., visual data, sound data, depth data, ambient lighting data, etc.) about the environment 100 or sensor data (e.g., visual data, sound data, depth data, physiological data, etc.) about the users 110, 130, 160. Such information may, subject to user authorizations, permissions, and preferences, be shared amongst the device 105, 125, 165 to enhance the user experiences on such devices.

In some implementations, the devices 105, 125, 165 obtain physiological data (e.g., EEG amplitude/frequency, pupil modulation, eye gaze saccades, etc.) from the users 110, 130, 160 via one or more sensors that are proximate or in contact with the respective user 110, 130, 160. For example, the device 105 may obtain pupillary data (e.g., eye gaze characteristic data) from an inward facing eye tracking sensor. In some implementations, the devices 105, 125, 165 include additional sensors for obtaining image or other sensor data of the physical environment 100.

In some implementations, the devices 105, 125, 165 are wearable devices such as ear-mounted speaker/microphone devices (e.g., headphones, ear pods, etc.), smart watches, smart bracelets, smart rings, smart/AR glasses, or other head-mounted devices (HMDs). In some implementations, the devices 105, 125, 165 are handheld electronic devices (e.g., smartphones or tablets). In some implementations, the devices 105, 125, 165 are laptop computers or desktop computers. In some implementations, the devices 105, 125, 165 have input devices such as audio command input systems, gesture recognition-based input systems, touchpads or touch-sensitive displays (also known as a "touch screen" or "touch screen display"). In some implementations, multiple devices are used together to provide various features. For example, a smart phone (connected wirelessly and interoperating with wearable device(s)) may provide computational resources, connections to cloud or internet services, location services, etc.

FIG. 1 illustrates an example in which the devices within the physical environment 100 include HMD devices 105, 125, 165. Numerous other types of devices may be used including mobile devices, tablet devices, wearable devices, hand-held devices, personal assistant devices, AI-assistant-based devices, smart speakers, desktop computing devices, menu devices, cash register devices, vending machine devices, juke box devices, or numerous other devices capable of presenting content, capturing sensor data, or communicating with other devices within a system, e.g., via wireless communication. For example, assistance may be provided to a vision impaired person to help the person understand a menu by providing data from the menu to a device being worn by the vision impaired person, e.g., enabling that device to enhance the user's understanding of the menu by providing visual annotations, audible cues, etc.

In some implementations, the devices 105, 125, 165 include eye tracking systems for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, an illumination source on a device may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown the device. Additional cameras may be included to capture other areas of the user (e.g., an HMD with a jaw cam to view the user's mouth, a down cam to view the body, an eye cam for tissue around the eye, and the like). These cameras and other sensors can detect motion of the body, or signals of the face modulated by the breathing of the user (e.g., remote PPG).

In some implementations, the devices 105, 125, 165 have graphical user interfaces (GUIs), one or more processors, memory and one or more modules, programs or sets of instructions stored in the memory for performing multiple functions. In some implementations, the users 110, 130, 160 may interact with a GUI through voice commands, finger contacts on a touch-sensitive surface, hand/body gestures, remote control devices, or other user input mechanisms. In some implementations, the functions include viewing/listening to content, image editing, drawing, presenting, word processing, website creating, disk authoring, spreadsheet making, game playing, telephoning, video conferencing, e-mailing, instant messaging, workout support, digital photographing, digital videoing, web browsing, digital music playing, or digital video playing. Executable instructions for performing these functions may be included in a computer readable storage medium or other computer program product configured for execution by one or more processors.

In some implementations, the devices 105, 125, 165 employ various physiological or behavioral sensor, detection, or measurement systems. Detected physiological data may include, but is not limited to, EEG, electrocardiogra electromyography (EMG), functional near infrared spectroscopy signal (fNIRS), blood pressure, skin conductance, or pupillary response. Detected behavioral data may include, but is not limited to, facial gestures, facial expressions, body gestures, or body language based on image data, voice recognition based on acquired audio signals, etc.

In some implementations, the devices 105, 125, 165 (or other devices) may be communicatively coupled to one or more additional sensors. For example, a sensor (e.g., an EDA sensor) may be communicatively coupled to a device 105, 125, 165 via a wired or wireless connection, and such a sensor may be located on the skin of a user (e.g., on the arm, placed on the hand/fingers of the user, etc.). For example, such a sensor can be utilized for detecting EDA (e.g., skin conductance), heart rate, or other physiological data that utilizes contact with the skin of a user. Moreover, a device 105, 125, 165 (using one or more sensors) may concurrently detect multiple forms of physiological data in order to benefit from synchronous acquisition of physiological data or behavioral data. Moreover, in some implementations, the physiological data or behavioral data represents involuntary data, e.g., responses that are not under conscious control. For example, a pupillary response may represent an involuntary movement. In some implementations, a sensor is placed on the skin as part of a watch device, such as a smart watch.

In some implementations, one or both eyes of a user, including one or both pupils of the user present physiological data in the form of a pupillary response (e.g., eye gaze characteristic data). The pupillary response of the user may result in a varying of the size or diameter of the pupil, via the optic and oculomotor cranial nerve. For example, the pupillary response may include a constriction response (miosis), e.g., a narrowing of the pupil, or a dilation response (mydriasis), e.g., a widening of the pupil. In some implementations, a device may detect patterns of physiological data representing a time-varying pupil diameter. In some implementations, the device may further determine the inter-pupillary distance (IPD) between a right eye and a left eye of the user.

The user data (e.g., upper facial feature characteristic data, lower facial feature characteristic data, and eye gaze characteristic data, etc.), including information about the position, location, motion, pose, etc., of the head or body of the user, may vary in time and a device 105, 125, 165 (or other devices) may use the user data to track a user state. In some implementations, the user data includes texture data of the facial features such as eyebrow movement, chin movement, nose movement, cheek movement, etc. For example, when a person (e.g., user 110, 130, 160) performs a facial expression or micro expression associated with lack of familiarity or confusion, the upper and lower facial features can include a plethora of muscle movements that are used to assess the state of the user based on the captured data from sensors.

The physiological data (e.g., eye data, head/body data, etc.) and behavioral data (e.g., voice, facial recognition, etc.) may vary in time and the device may use the physiological data or behavioral data to measure a physiological/behavioral response or the user's attention to object or intention to perform an action. Such information may be used to identify a state of the user with respect to whether the user needs or desires assistance.

Information about such assistance predictions and how a user's own data is used may be provided to a user and the user given the option to opt out of automatic predictions/use of their own data and given the option to manually override assistance features. In some implementations, the system is configured to ensure that users' privacy is protected by requiring permissions to be granted before user state is assessed or assistance is enabled.

FIG. 2 illustrates an example of sensor data interpreted to identify a requirement for user assistance. In this example, a first set of sensor data 205 corresponds to a user's eyes 210a-b (e.g., depicting each eyes iris 215a-b, eye lids 225a-b, and other eye/surrounding area features) and a second set of sensor data 250 corresponds to a user's lower face including upper lip 255 and lower lip 260 and surrounding areas of the face. In this example, the first and second sets of sensor data 205, 250 are interpreted to identify a user state indicative of the user needing, desiring, or otherwise potentially benefitting from assistance. In this example, one or more gaze directions of the user (e.g., gaze direction 220a of eye 210a and gaze direction 220b of eye 210b) are assessed, e.g., tracking where the user is gazing and gaze behavior over time. Such gazing and gaze behavior (e.g., staring off to the user's upper left or right) may be indicative or interpreted as indicative of the user trying to remember something or being uncertain about something. The user's pupil size and behavior may similarly be indicative of the user's state. The user's expression (as assessed by the user's forehead regions 225*a-b* and lower face (e.g., lip 255, 260 position, thickness, angle, expression, micro-expression, etc.) may similarly be used to interpret the user's state.

In some implementations, sensor data from multiple sensors and corresponding to different portions of a user's body (e.g., eyes, face, shoulders, arms, etc.) is combined and used as input to a sensor-fusion-based technique for identifying or characterizing a user's state. Such a technique may be implemented, as examples, as an algorithm or machine learning model. Sensor data may come from other sources as described herein, including but not limited to, from sensors on other devices worn by the user or otherwise available in the environment to provide sensor data about the user or the environment.

In one example, a sensor-fusion machine learning model is trained to predict whether a user is exhibiting one or more specific user states (e.g., confused, wanting assistance, etc.) based on input training data that provides sets of sensor data corresponding to sensor data from each of multiple sensors corresponding to each of multiple portions of the user and a ground truth result, e.g., for sample input data set one the user is known to be confused and wanting assistance, for sample input data set two the user is known to not be confused and not wanting assistance, etc. In some implementations, such training data is based on many users, e.g., prior to a device's deployment to a particular user. In some implementations, at least some of the training data generated and used is based on a particular user's use of their device(s), e.g., capturing user expression at the time or just before the time a user manually requests assistance. Similarly, if a device predicts that a user state is wanting assistance and then the user subsequently declines assistance, the device may update its algorithms or machine learning models with the new information/new training data to improve its future predictive accuracy.

In some implementations, an understanding of the physical environment 100 is generated and used to determine a user state. For example, a physical environment 100 may be characterized by type (e.g., family room, conference hall, classroom, etc.). As another example, a physical environment may be characterized as having one or more characteristics (e.g., crowded, unoccupied, hazardous, unevenly floored, having a particular number of people or being within an occupancy range, being large in size, being small in size, having a particular square footage or being within a size range, being noisy, having noise of a particular volume or within a particular volume range, having good/bad lighting, lighting of a certain level or within a certain range, etc.). A physical environment 100 may be assessed based on sensor data, location data, or other data from other sources and used to determine user state. For example, a particular user expression might be interpreted as indicating that the user wants assistance in a dimly lit, crowded environment, having many obstacles, that the user has not previously visited but that same user expression may be interpreted as not indicating that the user wants assistances in the user's own well-lit home.

In some implementations, a user's gaze direction is used to identify an object or activity to which the user is attentive, and this is used to determine the user state, e.g., whether the user needs or desires assistance. For example, a user expression that is potentially indicative of a user wanting assistance may be interpreted based on the user looking at a door 150 to a restroom while making a particular expression. In addition, user movement (or lack thereof) may indicate a user's interest or intention in navigating to a particular destination within a physical environment 100 but needing or desiring guidance to move to that destination. For example, the user may gaze in the direction of the door 150 to a restroom for more than a threshold amount of time (e.g., 5 seconds) without moving towards the door 150. Such focus and lack of movement together may be used to identify that the user state corresponds to the user needing or desiring assistance in navigating to the restroom.

FIG. 3 illustrates another example of sensor data interpreted to identify a requirement for special assistance. In this example, a first set of sensor data 305 captured at an initial point in time depicts the user with constricted pupils 310*a-b* while a second set of sensor data 350 captured at a subsequent point in time depicts the user with dilated pupils 360*a-b*. The pupillary change may be interpreted as an indication of user state, e.g., that the user is startled or overwhelmed, for example, by the unfamiliarity of a physical environment 100 upon entering (or shortly after entering) the environment 100. Since pupillary expansion can be associated with multiple different user states, other sensor data or contextual information, may be used to enhance the accuracy of a user state prediction based on user pupillary response, e.g., identifying when the user enters a new environment relative to the timing of the pupillary change, what the user is looking at when the pupillary change occurs, whether another condition such as a change in lighting may be responsible for the change, etc.

Generally, multiple user attributes may be assessed and collectively indicate with a level of confidence that a user has a particular state. For example, a nose scrunched up, a forehead scrunched up, one eyebrow raised, and lips pursed user attributes may individually provide a relatively low confidence that a user state is one associated with needing or wanting assistance, while those same features all together at or around the same point in time may provide a much higher level of confidence in the user state. Similarly, a user's individual behavioral movements (e.g., being stationary, turning as if searching for something or to take in an entire environment, scratching their head, rubbing their chin, stepping backwards, entering an environment and pausing without approaching furniture or another person, etc.) may provide a low level of confidence of user state individually, but when combined with one another or with other indicators may provide a much higher level of confidence in the user state.

A user's individual behaviors that are indicative of user state may be specific to the user. In some implementations, a device learns such individualized characteristics that are indicative of user state based on how the user uses their device(s) over time. For example, if the user typically rubs their chin before manually requesting assistance such behavior can be learned to be associated with a user state associated with needing or wanting assistance.

User behavior, as assessed based on sensor data, may also be indicative of a user straining to sense the environment or otherwise not seeing or hearing the environment with a desired level of acuity. For example, the user may squint their eyes in an attempt to see distant objects that appear blurry to the user, stand on tip toes to attempt to see over obstacles, use their hand as a light-blocking device above their eyes, tilt their head to hear better, cup a hand around an ear to hear better, etc. Such behaviors may be identified or otherwise used in determining user state.

In some implementations, a user's movement pattern, e.g., where and how the user walks or moves, is indicative of the user state. For example, the device may recognize when a user takes a few steps forward and then backs up as an indication that the user may have realized that a desired location/destination was actually not in the direction that the user initially moved. Such behaviors may be identified or otherwise used in determining user state.

In some implementations, a user's intention to perform a particular act is determined and used to determine the user's state. For example, the device may recognize that a user has entered an environment having a set of potentially desirable activities and a set of potentially undesirable activities, e.g., at a party it (potentially) being desirable to talk with other people, get a drink from a bar, go to a food station line, or find an open seat at a table and (potentially) undesirable to stand in a location blocking a doorway or stand for a long period alone. The device may assess a user's state based on whether the user is participating in a desirable activity or an undesirable activity, e.g., determining that the user state may correspond to the user needing or wanting assistance based on the user standing alone in a location blocking a doorway for more than a threshold amount of time. User preferences may be specified or learned over time to better identify activities that a user may desire or desire to avoid and thus to better interpret the user's state for purposes of offering or providing assistance.

In another example, a user scanning a physical environment 100 for more than a threshold amount of time is used as an indication that the user is looking for something or someone or whether the user state corresponds to needing or wanting assistance. In some implementations, user search-ing behavior patterns (e.g., particular eye movements, head movements, or the behavior) are identified and used to determine user state. For example, if the user scans from left to right (or right to left) looking at each face/head in the environment one or more times, such behavior may be indicative of the user searching for (and not finding) a particular person, which may be used in determining the user state.

FIG. 4 is a flowchart representation of a method 400 for providing XR content based on identifying a user require-ment for assistance. In some implementations, a device such as one or more of devices 105, 125, 165 (FIG. 1) performs the techniques of method 400 based on determining a user state or a scene understanding of a physical environment. In some implementations, the techniques of method 400 are performed on a mobile device, desktop, laptop, HMD, wearable device, or server device. In some implementations, the method 400 is performed on processing logic, including hardware, firmware, software, or a combination thereof. In some implementations, the method 400 is performed on a processor executing code stored in a non-transitory com-puter-readable medium (e.g., a memory).

At block 402, the method 400 captures sensor data while the electronic device is worn by a user in a physical environment. A user assistance feature may be enabled on the device to assist the user with physical environment understanding based on a user state. In some implementa-tions, the sensor data corresponds to expressions, gestures, and behaviors of the user. In some implementations, the sensor data corresponds to physiological data and may include EEG amplitude/frequency, image data of the user's face, pupil modulation, eye gaze saccades, EDA, heart rate, and the like. For example, obtaining the sensor data may involve obtaining images of the eye or EOG data from which gaze direction/movement can be determined, electrodermal activity/skin conductance, heart rate, via sensors on a watch (e.g., sensor).

The one or more sensors (e.g., physiological sensors, behavioral sensors, etc.) may include sensors on a device worn by the user (e.g., sensor, such as an EDA sensor on the back of a watch). The obtained physiological data or behav-ioral data may include measuring gaze (such as eye gaze stability) because, in the context of tracking user state, gaze direction and gaze direction changes over time may be indicative of the user's current state.

In some implementations, the sensor data corresponds to or is used to determine behavioral data that may include behavioral signals such as facial gestures based on image data (e.g., via internal facing cameras on an HMD), voice recognition based on acquired audio signals, hand gestures, and the like. Additionally, facial data may be included as behavioral data (e.g., reconstruction of the user's face based on obtained image data via an internal facing camera on a device, such as an HMD, or image date obtained from another source).

In some implementations, physiological data or behav-ioral data may be based on hand gesture data associated with detected hand or body movements based on image analysis or an input device such as a watch or other sensor data. For example, a user may be determined to have a particular user state based on the actions of a user (e.g., a user pointing at something or someone, touching another person or object, walking towards another person or object, jumping up and down in an excited manner, nodding in sync with the rhythm, beat, or cadence of the speech of another person or music/sound in the environment, etc.).

In some implementations, obtained physiological data (e.g., pupillary data) is associated with a gaze of a user based on obtaining images of the eye or electrooculography signal (EOG) data from which gaze direction or movement can be determined. In some implementations, the physiological data may include at least one of skin temperature, respira-tion, photoplethysmogram (PPG), electrodermal activity (EDA), eye gaze tracking, and pupillary movement that is associated with the user.

In some implementations, the sensor data includes image data such as light intensity image data or depth data from one or more depth sensors (e.g., a structured light, a time-of-flight, or the like) of the physical environment. In some implementations, the sensor data includes location data of the user (e.g., user 110) or the device (e.g., device 105).

In some implementations, a context or characteristic (e.g., loudness, crowdedness, number of audio sources, etc.) of an environment is determined based on sensor data from the one or more sensors. For example, identifying a context of the scene may determine that a user is at a birthday party (e.g., a birthday cake is identified), a sporting event (e.g., a scoreboard for a game is identified), a restaurant (e.g., based on identifying tables, menus, etc.), a cocktail party (e.g., based on groupings of standing people, etc.). Additionally, or alternatively, a context may be based on accessing a calendar application (e.g., the user is scheduled to be at a party at the current time).

In some implementations, the method 400 determines a context based on sensor data of the environment. For example, determining a context may involve using computer vision to generate a scene understanding of the visual or auditory attributes of the environment—where is the user, what is the user doing, what objects/people are nearby. Additionally, a scene understanding of the content could be generated that includes the visual or auditory attributes of what the user was watching. In some aspects, data is analyzed to determine where the user is, what the user is doing, what objects or people are nearby in the environment or within the content, what the user did earlier (e.g., meditated in the morning), etc. Additionally, context analysis may include image analysis (semantic segmentation), audio analysis (crowd sounds versus silence), location sensors (where the user is), motion sensors (a fast-moving vehicle is near), or access other user data (e.g., a user's calendar). In an exemplary implementation, the method 400 may further include determining the context by generating a scene understanding of the environment based on the sensor data of the environment, the scene understanding including visual or auditory attributes of the environment and determining the context based on the scene understanding of the environment.

In some implementations, blocks 404 or 406 are performed based on determining that an accessibility mode or assistance mode is enabled.

At block 404, the method 400 determines the user state based on monitoring the sensor data, where the user state corresponds to a user requirement (e.g., predicted need or desire) for assistance in the physical environment.

With respect to obtaining sensor data of a user and determining a user state, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user will have the ability to access and otherwise find out anything that the system has collected or determined about him or her. User data is stored securely on the user's device. User data that is used as input to a machine learning model is stored securely on the user's device, for example, to ensure the user's privacy. The user's device may have a secure storage area, e.g., a secure enclave, for securing certain user information, e.g., data from image and other sensors that is used for face identification, face identification, or biometric identification. The user data associated with the user's body or user state may be stored in such a secure enclave, restricting access to the user data and restricting transmission of the user data to other devices to ensure that the user data is kept securely on the user's device. User data may be prohibited from leaving the user's device and may be used only in machine learning models and other processes on the user's device.

Determining the user state may involve assessing user familiarity with the physical environment. User familiarity with the physical environment may be assessed or determined based on assessing data indicative of whether the user has previously visited the physical environment. User familiarity with the physical environment may be determined based on identifying uncertainty, hesitation, or confusion based on a posture, a behavior, or an expression of the user. Such behaviors or states may be determined using an algorithm or machine learning model. User state may be based on determining an orientation of a torso of the user in the physical environment, e.g., where the user's torso is pointing (e.g., towards an exit potentially indicating the user is uncomfortable or uncertain).

Determining the user state may be based on identifying a current task of the user. For example, user fidgeting or behavior indicating that the user wants or needs to take a break from standing may be used to determine sitting down as a task for the user. User behavior indicating that the user intends to relocate to a restroom (e.g., looking at a restroom sign) may be used to determine the task of navigating to a restroom. The user calling someone's name (e.g., as an attempt to locate that person) may be used to determine that the user wants to interact with that person.

In some implementations, determining the user state is based on identifying a gesture requesting assistance, e.g., a subtle gesture requesting assistance.

In some implementations, user state may be determined based on using physiological data to determine head pose, body pose, sounds, jaw movement, cheek movement, nose movement, movement of tissue surrounding an eye, or a signal of a face modulated by breath (e.g., PPG). For example, a determined respiratory rate may be approximately 7 breaths per minute. In some implementations, determining a respiratory rate may involve sensor fusion of different acquired data without using an additional respiratory sensor. For example, the different acquired data that may be fused may include head pose data from an IMU, audio from a microphone, camera images of the user's face or body (e.g., an HMD with a jaw cam, down cam, eye cam for tissue around the eye, and the like), motion of the body, or signal of the face modulated by the breath (e.g., remote PPG). Using this type of sensor fusion to track the breathing of the user, such as while wearing an HMD, may negate the need for a user to wear a sensor worn around the user's diaphragm, for example, to track his or her respiratory rates. User breathing having a particular pattern, characteristic, or rate may be indicative of a user state associated with the user needing or desiring assistance.

In some implementations, user state may be determined based on obtained physiological data and the context of the environment. A machine learning model may be used, for example, in which sensor data are input into the machine learning model to identify one or more user characteristics. For example, a machine learning model may be used to determine the user state based on eye tracking and other physiological data, behavioral data, and audio/visual content of the environment (e.g., a scene understanding). For example, one or more physiological or behavioral characteristics may be determined, aggregated, and used to classify the user state using statistical or machine learning techniques. In some implementations, sensor data corresponding to a user response or the user's state at a point or during a period of time may be compared with the user's own prior data.

In some implementations, user state is determined based on using the physiological data to measure gaze or body stability. In some implementations, the user state is determined based on determining a level of emotion (e.g., a Differential Emotions Scale (DES), a Levels of Emotional Awareness Scale (LEAS), and the like). In some implementations, the user state is determined based on the respiratory state (e.g., a particular range of a respiratory rate may indicate the user is comfortable, searching, confused, etc.).

In some implementations, determining that the user has a particular threshold of familiarity (e.g., high, low, etc.) or understanding of an environment is used to determine a user state. In some cases, user state is represented by a numerical value, e.g., a level of familiarity, comfort, confusion, predicted assistance need, etc. on a numerical scale. For example, the system could determine a level of need for assistance as a barometer that can be customized based on the environment, e.g., number of objects, number of people, amount of movement, number of sound sources, volume of total noise in the environment, etc.

In some implementations, a user state may be determined by using statistical or machine learning-based classification techniques. For example, determining that the user has more than a threshold need for assistance may include using a machine learning model trained using ground truth data that includes self-assessments in which users labelled portions of experiences with assistance need labels, e.g., on a scale from 1 to 10. For example, to determine the ground truth data that includes self-assessments, a group of subjects, while participating in various social scenarios, could be prompted at different time intervals (e.g., every 30 seconds) to label their own need for assistance.

In some implementations, one or more pupillary or EEG characteristics may be determined, aggregated, and used to classify the user state using statistical or machine learning techniques. In some implementations, the physiological data is classified based on comparing the variability of the physiological data to a threshold. For example, if the baseline for a user's EEG data is determined during an initial segment of time (e.g., 30-60 seconds), and during a subsequent segment of time (e.g., 30 second later) the EEG data deviates more than +/−10% from the EEG baseline during the subsequent segment of time, than the techniques described herein could classify the user as transitioned away from one state and entered a second state. Similarly, the heart rate data or EDA data may also be classified based on comparing the variability of the heart rate data or EDA data to a particular threshold.

At block 406, the method 400 presents content based on the user state, the content may be based on the user requirement for assistance in the physical environment. The content may be configured to (e.g., intended to, designed to, predicted to, etc.) mitigate or otherwise ease the user requirement for assistance in the physical environment.

In some implementations, the content guides the user to move from a current location to a destination within the physical environment. Such content may guide the user based on identifying an orientation of a torso of the user relative to the physical environment and instructions may be provided relative to the orientation of the torso of the user relative to the physical environment. Instructions may be adapted based on changes to the orientation of the torso of the user changing as the user moves.

FIG. 5 is a block diagram of an example device 800. Device 800 illustrates an exemplary device configuration for device 105, device 125, device 165, or any other device used in accordance with one or more of the techniques disclosed herein. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 810, one or more displays 812, one or more interior or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 812 correspond to diffractive, reflective, polarized, holographic, etc. waveguide displays. In one example, the device 800 includes a single display. In another example, the device 800 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a content instruction set 842, a scene understanding instruction set 844, a behavioral tracking instruction set 846, a physiological tracking instruction set 848, and an environment assistance instruction set 850. The instruction set(s) 840 may be embodied a single software executable or multiple software executables.

In some implementations, the content instruction set 842 is executable by the processing unit(s) 802 to provide or track content for display on a device. The content instruction set 842 may be configured to monitor and track the content over time (e.g., during an experience) or to change presented audio or visual content.

In some implementations, the scene understanding instruction set 844 is executable by the processing unit(s) 802 to determine a context of the environment (e.g., create a scene understanding to determine the objects or people in the content or in the environment, where the user is, what the user is doing, etc.) using one or more of the techniques discussed herein (e.g., object detection, facial recognition, etc.) or as otherwise may be appropriate.

In some implementations, the behavioral tracking instruction set 846 is executable by the processing unit(s) 802 to tracking activity of one or more users using one or more of the techniques discussed herein or as otherwise may be appropriate.

In some implementations, the physiological tracking instruction set 848 is executable by the processing unit(s) 802 to track a user's physiological attributes (e.g., EEG amplitude/frequency, pupil modulation, eye gaze saccades, heart rate, EDA data, etc.) using one or more of the techniques discussed herein or as otherwise may be appropriate.

In some implementations, the environmental assistance instruction set 850 is executable by the processing unit(s) 802 to assess the user state based on sensor data and provide assistive content based on the user state using one or more of the techniques discussed herein or as otherwise may be appropriate. To these ends, in various implementations, the instruction includes instructions or logic therefor, and heuristics and metadata therefor.

Although the instruction set(s) 840 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, or firmware chosen for a particular implementation.

Figure 6:
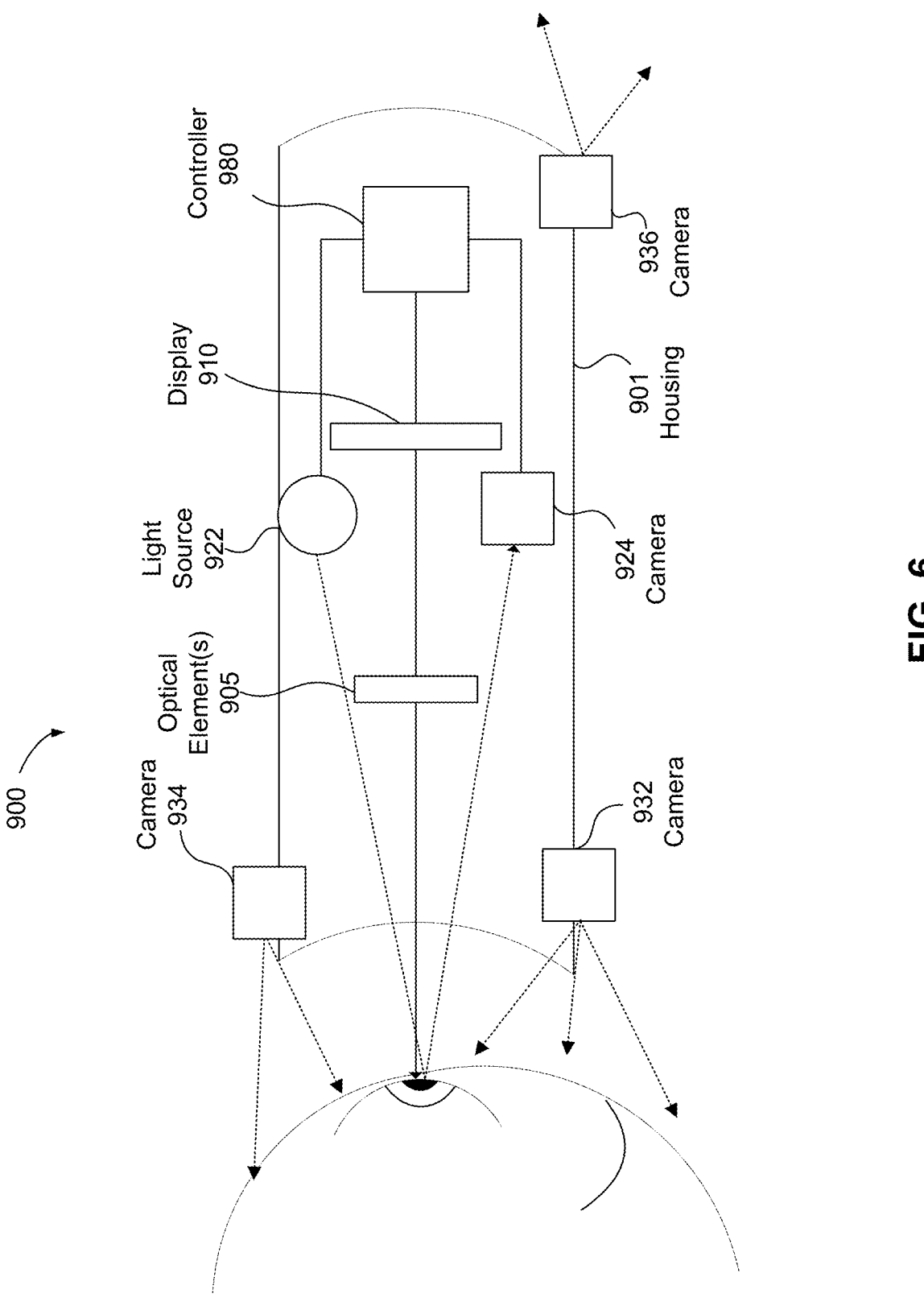
FIG. 6 illustrates an example head-mounted device (HMD) in accordance with some implementations.

FIG. 6 illustrates a block diagram of an exemplary head-mounted device 900 in accordance with some implementations. The head-mounted device 900 includes a housing 901 (or enclosure) that houses various components of the head-mounted device 900. The housing 901 includes (or is coupled to) an eye pad (not shown) disposed at a proximal (to the user) end of the housing 901. In various implementations, the eye pad is a plastic or rubber piece that comfortably and snugly keeps the head-mounted device 900 in the proper position on the face of the user 110 (e.g., surrounding the eye of the user).

The housing 901 houses a display 910 that displays an image, emitting light towards or onto the pupil of an eye of a user. In various implementations, the display 910 emits the light through an eyepiece having one or more optical elements 905 that refracts the light emitted by the display 910, making the display appear to the user to be at a virtual distance farther than the actual distance from the eye to the display 910. For example, optical element(s) 905 may include one or more lenses, a waveguide, other diffraction optical elements (DOE), and the like. For the user to be able to focus on the display 910, in various implementations, the virtual distance is at least greater than a minimum focal distance of the eye (e.g., 7 cm). Further, in order to provide a better user experience, in various implementations, the virtual distance is greater than 1 meter.

The housing 901 also houses a tracking system including one or more light sources 922, camera 924, camera 932, camera 934, camera 936, and a controller 980. The one or more light sources 922 emit light onto the eye of the user that reflects as a light pattern (e.g., a circle of glints) that can be detected by the camera 924. Based on the light pattern, the controller 980 can determine an eye tracking characteristic of the user. For example, the controller 980 can determine a gaze direction or a blinking state (eyes open or eyes closed) of the user. As another example, the controller 980 can determine a pupil center, a pupil size, or a point of regard associated with the pupil 50. Thus, in various implementations, the light is emitted by the one or more light sources 922, reflects off the eye of the user, and is detected by the camera 924. In various implementations, the light from the eye of the user is reflected off a hot mirror or passed through an eyepiece before reaching the camera 924.

The display 910 emits light in a first wavelength range and the one or more light sources 922 emit light in a second wavelength range. Similarly, the camera 924 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user selects an option on the display 910 by looking at it), provide foveated rendering (e.g., present a higher resolution in an area of the display 910 the user is looking at and a lower resolution elsewhere on the display 910), or correct distortions (e.g., for images to be provided on the display 910).

In various implementations, the one or more light sources 922 emit light towards the eye of the user, which reflects in the form of a plurality of glints.

In various implementations, the camera 924 is a frame/shutter-based camera that, at a particular point in time or multiple points in time at a frame rate, generates an image of the eye of the user. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 932, camera 934, and camera 936 are frame/shutter-based cameras that, at a particular point in time or multiple points in time at a frame rate, can generate an image of the face of the user 110 or capture an external physical environment. For example, camera 932 captures images of the user's face below the eyes, camera 934 captures images of the user's face above the eyes, and camera 936 captures the external environment of the user (e.g., environment 100 of FIG. 1). The images captured by camera 932, camera 934, and camera 936 may include light intensity images (e.g., RGB) or depth image data (e.g., Time-of-Flight, infrared, etc.).

A physical environment refers to a physical world that people can sense or interact with without aid of electronic devices. The physical environment may include physical features such as a physical surface or a physical object. For example, the physical environment corresponds to a physical park that includes physical trees, physical buildings, and physical people. People can directly sense or interact with the physical environment such as through sight, touch, hearing, taste, and smell. In contrast, an extended reality (XR) environment refers to a wholly or partially simulated environment that people sense or interact with via an electronic device. For example, the XR environment may include augmented reality (AR) content, mixed reality (MR) content, virtual reality (VR) content, or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information or physiological data will comply with well-established privacy policies or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor;
   capturing sensor data while the electronic device is worn by a user in a physical environment, wherein a user assistance feature is enabled on the device to assist with physical environment understanding based on a user state;

in accordance with the assistance feature being enabled:

determining the user state in the physical environment based on monitoring the sensor data, wherein the user state corresponds to a user requirement for assistance in the physical environment; and presenting content based on the user state, the content at least partially based on the user requirement for assistance in the physical environment, wherein the content provides the assistance by guiding the user to move within the physical environment to a specific location.

2. The method of claim 1, wherein the user state comprises a user familiarity with the physical environment, and wherein the user familiarity with the physical environment is determined based on:

assessing data indicative of whether the user has previously visited the physical environment; or identifying uncertainty, hesitation, or confusion based on a posture, a behavior, or an expression of the user.

3. The method of claim 1, wherein determining the user state is based on determining an orientation of a torso of the user in the physical environment.

4. The method of claim 1, wherein determining the user state is based on identifying a current task of the user.

5. The method of claim 1, wherein the content guides the user to move from a current location to a destination within the physical environment.

6. The method of claim 1, wherein the content guides the user based on:

identifying an orientation of a torso of the user relative to the physical environment; and instructions provided relative to the orientation of the torso of the user relative to the physical environment.

7. The method of claim 1, wherein the sensor data comprises images of an eye region and a mouth region of the user, and wherein the method further comprises recognizing an expression of the user based on the sensor data, wherein the user state is determined based on recognizing the expression.

8. The method of claim 1, wherein the sensor data comprises images of a hand of the user, and wherein the method further comprises recognizing a gesture of the user based on the sensor data, wherein the user state is determined based on recognizing the gesture.

9. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

capturing sensor data while the device is worn by a user in a physical environment, wherein a user assistance feature is enabled on the device to assist with physical environment understanding based on a user state;

in accordance with the assistance feature being enabled:

determining the user state in the physical environment based on monitoring the sensor data, wherein the user state corresponds to a user requirement for assistance in the physical environment; and presenting content based on the user state, the content at least partially based on the user requirement for assistance in the physical environment, wherein the content provides the assistance by guiding the user to move within the physical environment to a specific location.

10. The device of claim 9, wherein the user state comprises a user familiarity with the physical environment, and wherein the user familiarity with the physical environment is determined based on:

assessing data indicative of whether the user has previously visited the physical environment; or identifying uncertainty, hesitation, or confusion based on a posture, a behavior, or an expression of the user.

11. The device of claim 9, wherein determining the user state is based on determining an orientation of a torso of the user in the physical environment.

12. The device of claim 9, wherein determining the user state is based on identifying a current task of the user.

13. The device of claim 9, wherein the content guides the user to move from a current location to a destination within the physical environment.

14. The device of claim 9, wherein the content guides the user based on:

identifying an orientation of a torso of the user relative to the physical environment; and instructions provided relative to the orientation of the torso of the user relative to the physical environment.

15. The device of claim 9, wherein the sensor data comprises images of an eye region and a mouth region of the user, and wherein the operations further comprises recognizing an expression of the user based on the sensor data, wherein the user state is determined based on recognizing the expression.

16. The device of claim 9, wherein the sensor data comprises images of a hand of the user, and wherein the method further comprises recognizing a gesture of the user based on the sensor data, wherein the user state is determined based on recognizing the gesture.

17. A non-transitory computer-readable storage medium, storing program instructions executable by one or more processors to perform operations comprising:

capturing sensor data while an electronic device is worn by a user in a physical environment, wherein a user assistance feature is enabled on the electronic device to assist with physical environment understanding based on a user state;

in accordance with the assistance feature being enabled:

determining the user state in the physical environment based on monitoring the sensor data, wherein the user state corresponds to a user requirement for assistance in the physical environment; and presenting content based on the user state, the content at least partially based on the user requirement for assistance in the physical environment, wherein the content provides the assistance by guiding the user to move within the physical environment to a specific location.

18. The non-transitory computer-readable storage medium of claim 17, wherein the user state comprises a user familiarity with the physical environment, and wherein the user familiarity with the physical environment is determined based on:

assessing data indicative of whether the user has previously visited the physical environment; or identifying uncertainty, hesitation, or confusion based on a posture, a behavior, or an expression of the user.

19. The non-transitory computer-readable storage medium of claim 17, wherein determining the user state is based on determining an orientation of a torso of the user in the physical environment.

20. The non-transitory computer-readable storage medium of claim 17, wherein determining the user state is based on identifying a current task of the user.

21. The non-transitory computer-readable storage medium of claim 17, wherein the content guides the user to move from a current location to a destination within the physical environment.

22. The non-transitory computer-readable storage medium of claim 17, wherein the content guides the user based on:

identifying an orientation of a torso of the user relative to the physical environment; and instructions provided relative to the orientation of the torso of the user relative to the physical environment.

23. The non-transitory computer-readable storage medium of claim 17, wherein the sensor data comprises images of an eye region and a mouth region of the user, and wherein the method further comprises recognizing an expression of the user based on the sensor data, wherein the user state is determined based on recognizing the expression.

24. The non-transitory computer-readable storage medium of claim 17, wherein the sensor data comprises images of a hand of the user, and wherein the method further comprises recognizing a gesture of the user based on the sensor data, wherein the user state is determined based on recognizing the gesture.

\*     \*     \*     \*     \*